US011363054B2

(12) United States Patent
Kang et al.

(10) Patent No.: US 11,363,054 B2
(45) Date of Patent: Jun. 14, 2022

(54) APPARATUS AND METHOD FOR ANALYZING SECURITY VULNERABILITIES

(71) Applicant: NAVER CLOUD CORPORATION, Seongnam-si (KR)

(72) Inventors: Bong Goo Kang, Seongnam-si (KR); Min Seob Lee, Seongnam-si (KR); Won Tae Jang, Seongnam-si (KR); June Ahn, Seongnam-si (KR); Jihwan Yoon, Seongnam-si (KR)

(73) Assignee: NAVER CLOUD CORPORATION, Seongnam-si (KR)

( * ) Notice: Subject to any disclaimer, the term of this patent is extended or adjusted under 35 U.S.C. 154(b) by 328 days.

(21) Appl. No.: 16/830,604

(22) Filed: Mar. 26, 2020

(65) Prior Publication Data

US 2020/0314136 A1 Oct. 1, 2020

(30) Foreign Application Priority Data

Mar. 28, 2019 (KR) .................... 10-2019-0036360

(51) Int. Cl.
*H04L 9/40* (2022.01)
*G06F 16/951* (2019.01)
(Continued)

(52) U.S. Cl.
CPC ........ *H04L 63/1433* (2013.01); *G06F 16/951* (2019.01); *H04L 63/1416* (2013.01);
(Continued)

(58) Field of Classification Search
CPC ............. H04L 63/1433; H04L 63/1416; H04L 63/1483; H04L 67/02; H04L 61/1505; G06F 16/951; G06F 21/577
See application file for complete search history.

(56) References Cited

U.S. PATENT DOCUMENTS 10,454,969 B2 * 10/2019 Haerterich .......... H04L 63/1491
10,579,803 B1 * 3/2020 Mueller ................ G06F 21/577
(Continued)

FOREIGN PATENT DOCUMENTS

| KR | 1020120121668 A | 11/2012 |
| KR | 101424504 B1 | 7/2014 |
| KR | 1020180009510 A | 1/2018 |

OTHER PUBLICATIONS

Office action issued in corresponding Korean application No. 10-2019-0036360, dated Jun. 19, 2020.

*Primary Examiner* — Cheng-Feng Huang
(74) *Attorney, Agent, or Firm* — Greer Burns & Crain Ltd.

(57) ABSTRACT

A method for analyzing vulnerabilities may include: an analysis target URL receiving step of receiving a plurality of analysis target uniform resource locator (URL) addresses extracted from the analysis target server; an identification key setting step of setting respective identification keys corresponding to the plurality of analysis target URL addresses; a vulnerability analyzing step of performing a simulated attack so as to access the external server by the analysis target server by inserting an analysis hypertext transfer protocol (HTTP) request sentence including a URL address of an external server and the identification key into the analysis target URL address; an access record checking step of requesting an access record of the analysis target server to the external server; and a vulnerability extracting step of extracting a vulnerability of the analysis target server by using the identification key included in the access record.

12 Claims, 8 Drawing Sheets

(51) Int. Cl.
*H04L 67/02* (2022.01)
*G06F 21/57* (2013.01)
*H04L 61/4505* (2022.01)

(52) U.S. Cl.
CPC .......... *H04L 63/1483* (2013.01); *H04L 67/02* (2013.01); *G06F 21/577* (2013.01); *H04L 61/1505* (2013.01)

(56) References Cited

U.S. PATENT DOCUMENTS

| | | | |
|---|---|---|---|
| 10,747,881 B1* | 8/2020 | Luo | G06F 9/54 |
| 2010/0333116 A1* | 12/2010 | Prahlad | G06F 16/1844 |
| | | | 713/153 |
| 2013/0097706 A1* | 4/2013 | Titonis | G06F 21/566 |
| | | | 726/22 |
| 2016/0285861 A1* | 9/2016 | Chester | G06F 21/335 |
| 2017/0223043 A1* | 8/2017 | Munoz | H04L 63/20 |
| 2019/0020683 A1* | 1/2019 | Haerterich | H04L 63/1491 |
| 2019/0197243 A1* | 6/2019 | Hendrickx | G06F 16/148 |
| 2019/0236661 A1* | 8/2019 | Hogg | G06F 16/9537 |
| 2019/0297107 A1* | 9/2019 | Jin | H04L 63/1416 |
| 2019/0327259 A1* | 10/2019 | DeFelice | H04L 63/1433 |

* cited by examiner

FIG. 7

| seq | domainNo | urlNo | paramName |
|---|---|---|---|
| 3 | 1 | 1 | no |
| 3 | 1 | 5 | no |
| 3 | 1 | 5 | url |

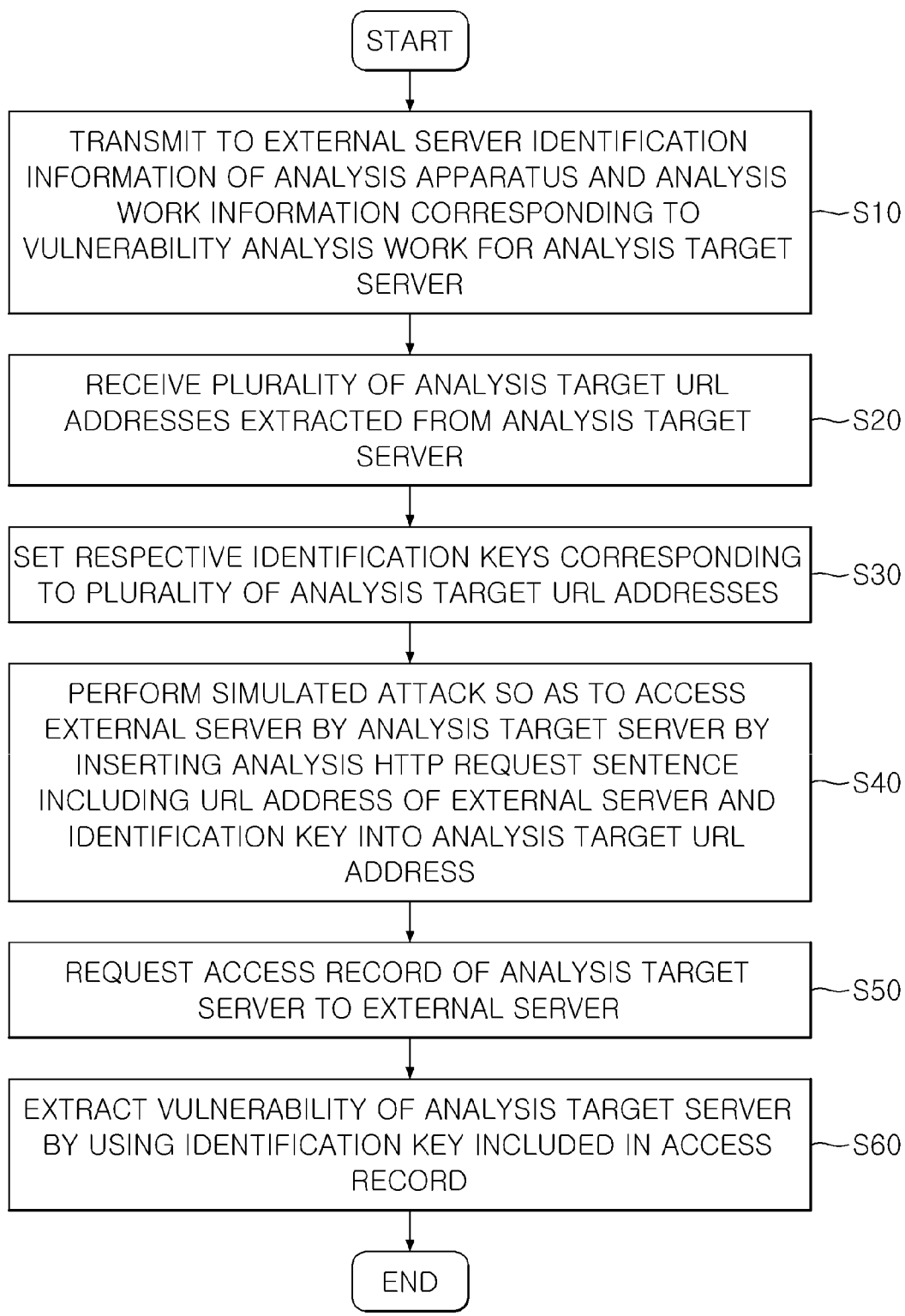

APPARATUS AND METHOD FOR ANALYZING SECURITY VULNERABILITIES

CROSS-REFERENCE TO RELATED APPLICATIONS

This application claims priority to Korean Patent Application No. 10-2019-0036360 filed on 28 Mar. 2019 in Korean Intellectual Property Office, the entire content of which is hereby incorporated by reference in its entirety.

BACKGROUND OF THE INVENTION

Field of Invention

The present invention relates to an apparatus and a method for analyzing vulnerabilities, which are capable of analyzing various types of vulnerabilities including server side request forgery (SSRF), etc.

Description of Related Art

In recent years, as web service and web interface become familiar with users, integration of a traditional application program to a web based system is accelerated. With the development of the web service, a problem of a web application itself, and adverse effects such as ignorance of a programmer for security, disabling of a firewall, avoidance of intrusion detection, and diversification of hacking tools are becoming serious problems.

In order to prevent various forms of attacks on the web application, intrusion of an attack code should be interrupted for each parameter included in a uniform resource locator (URL), and in order to fundamentally interrupt intrusion of the attack code for each parameter, whether there is vulnerability for each attack pattern should be first determined with respect to all parameters included in each URL.

BRIEF SUMMARY OF THE INVENTION

The present invention has been made in an effort to provide an apparatus and a method for analyzing vulnerabilities, which are capable of diagnosing various types of vulnerabilities including server side request forgery (SSRF), etc.

The present invention has also been made in an effort to provide an apparatus and a method for analyzing vulnerabilities, which are capable of determining accurate locations of various vulnerabilities including server side request forgery (SSRF), etc., which is included in an analysis target server.

The present invention has also been made in an effort to provide an apparatus and a method for analyzing vulnerabilities, which are capable of enhancing vulnerability analysis speed.

An exemplary embodiment of the present invention provides a method for analyzing vulnerabilities of an analysis target server. The method includes an analysis target URL receiving step of receiving a plurality of analysis target uniform resource locator (URL) addresses extracted from the analysis target server; an identification key setting step of setting respective identification keys corresponding to the plurality of analysis target URL addresses; a vulnerability analyzing step of performing a simulated attack so as to access the external server by the analysis target server by inserting an analysis hypertext transfer protocol (HTTP) request sentence including a URL address of an external server and the identification key into the analysis target URL address; an access record checking step of requesting an access record of the analysis target server to the external server; and a vulnerability extracting step of extracting a vulnerability of the analysis target server by using the identification key included in the access record.

Another exemplary embodiment of the present invention provides an analysis apparatus which includes: an analysis target URL reception unit receiving a plurality of analysis target uniform resource locator (URL) addresses extracted from the analysis target server; an identification key setting unit setting respective identification keys corresponding to the plurality of analysis target URL addresses; a vulnerability analysis unit performing a simulated attack so as to access the external server by the analysis target server by inserting an analysis hypertext transfer protocol (HTTP) request sentence including a URL address of an external server and the identification key into the analysis target URL address; an access record checking unit requesting an access record of the analysis target server to the external server; and a vulnerability extraction unit extracting a vulnerability of the analysis target server by using the identification key included in the access record.

Still another exemplary embodiment of the present invention provides an analysis apparatus which includes: a processor; and a memory coupled to the processor, in which the memory includes one or more modules configured to be executed by the processor, and the one or more modules include commands of receiving a plurality of analysis target uniform resource locator (URL) addresses extracted from the analysis target server, setting respective identification keys corresponding to the plurality of analysis target URL addresses, performing a simulated attack so as to access the external server by the analysis target server by inserting an analysis hypertext transfer protocol (HTTP) request sentence including a URL address of an external server and the identification key into the analysis target URL address, requesting an access record of the analysis target server to the external server, and extracting a vulnerability of the analysis target server by using the identification key included in the access record.

Furthermore, the technical solution above does not list all features of the present invention. Various features of the present invention and advantages and effects according thereto will be understood in more detail with reference to specific embodiments below.

According to an exemplary embodiment of the present invention, by an apparatus and a method for analyzing vulnerabilities, since each identification key set in a URL address included in a URL address included in an analysis target server can be represented as an access record to an external server, it is possible to determine an accurate location of a vulnerability included in the analysis target server.

According to an exemplary embodiment of the present invention, by an apparatus and a method for analyzing vulnerabilities, since an identification key corresponding to the URL address of the analysis target server can be extracted from the access record of the external server collectively, a vulnerability analysis speed can be enhanced.

According to an exemplary embodiment of the present invention, by an apparatus and a method for analyzing vulnerabilities, since identification information of an analysis apparatus is previously registered in the external server, prevention of misdetection for an SSRF vulnerability and a security for the access record can be enhanced.

However, effects which can be obtained by the apparatus and the method for analyzing vulnerabilities according to the exemplary embodiments of the present invention are not limited to the aforementioned advantages and other unmentioned advantages will be clearly understood by those skilled in the art from the following description.

BRIEF DESCRIPTION OF THE DRAWINGS

FIG. 7 is a table showing an access record in an external server according to an exemplary embodiment of the present invention.

FIG. 8 is a flowchart showing a method for analyzing vulnerabilities according to an exemplary embodiment of the present invention.

DETAILED DESCRIPTION OF THE INVENTION

Figure 1:
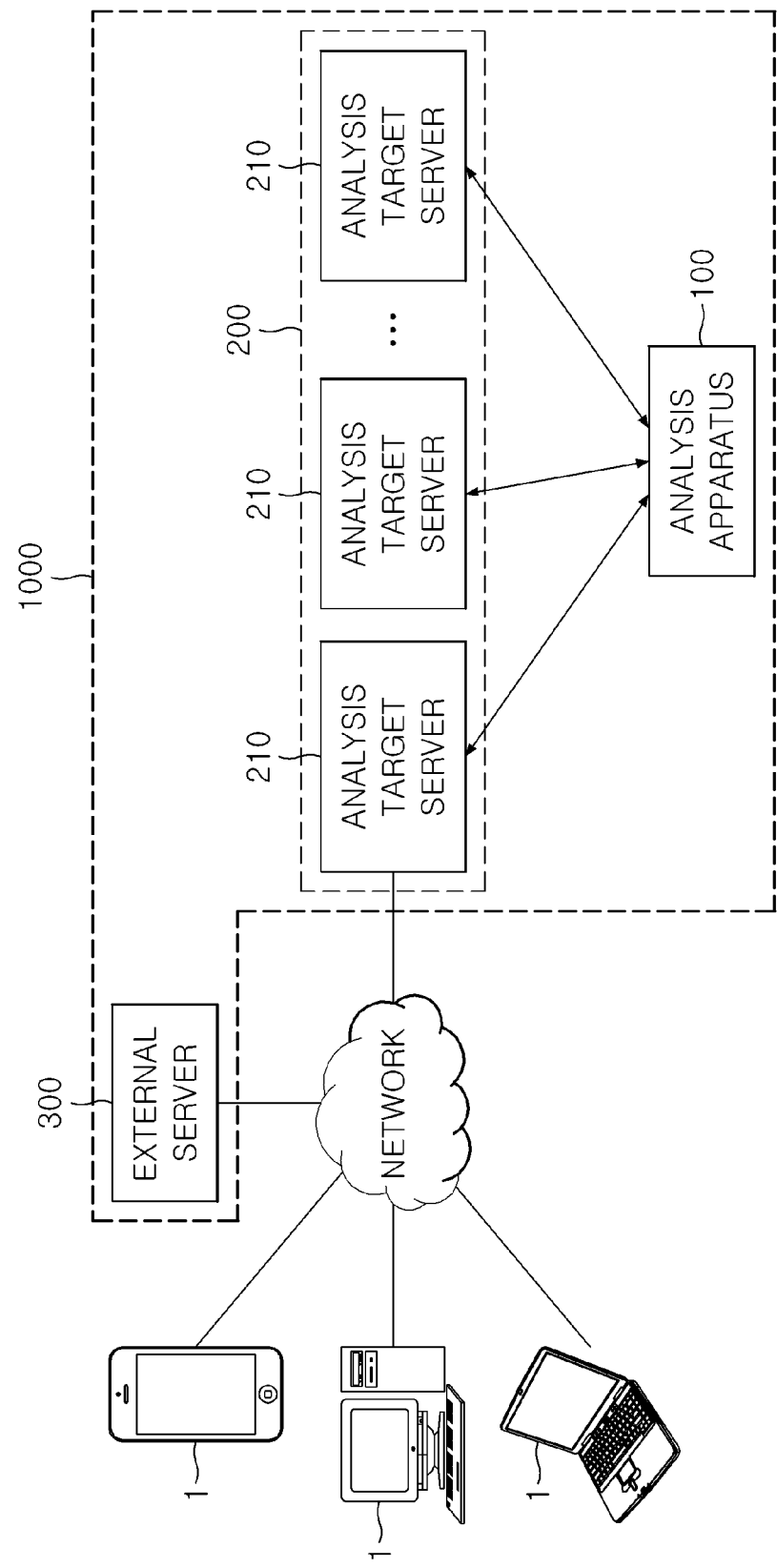
FIG. 1 is a schematic view illustrating a vulnerability analysis system according to an exemplary embodiment of the present invention.

Hereinafter, exemplary embodiments disclosed in this specification will be described in detail with reference to the accompanying drawings and the same or similar components are denoted by the same reference numerals regardless of the sign of the drawing, and duplicated description thereof will be omitted. Suffixes "module" and "unit" for components used in the following description are given or mixed in consideration of easy preparation of the specification only and do not have their own distinguished meanings or roles. Further, the term "unit" used in the specification means software and hardware components such as FPGA or ASIC and the "unit" performs predetermined roles. However, the "unit" is not a meaning limited to software or hardware. The "unit" may be configured to reside on an addressable storage medium and may be configured to play back one or more processors. Accordingly, as one example, the "unit" includes components such as software components, object oriented software components, class components, and task components, processes, functions, attributes, procedures, subroutines, segments of a program code, drivers, firmware, microcode, circuitry, data, databases, data structures, tables, arrays, and variables. Functions provided in the components and the "units" may be combined into a smaller number of components and "units" or further separated into additional components and "units".

In describing an exemplary embodiment disclosed in the present invention, a detailed description of related known technologies will be omitted if it is determined that the detailed description makes the gist of the exemplary embodiment of the present invention unclear. Further, it is to be understood that the accompanying drawings are just used for easily understanding the exemplary embodiments disclosed in this specification and a technical spirit disclosed in this specification is not limited by the accompanying drawings and all changes, equivalents, or substitutes included in the spirit and the technical scope of the present invention are included.

Referring to FIG. 1, a vulnerability analysis system 1000 according to an exemplary embodiment of the present invention may include an analysis apparatus 100, a cloud server 200, and an external server 300.

The analysis apparatus 100 analyzes an analysis target server 210 in the cloud server 200 to extract security vulnerabilities of a web page, a web application, etc., provided by the analysis target server 210. That is, due to a defect of hardware or software of the analysis target server 210 or a weak point in the design, weak points which enable an operation of a right granted to a user of a terminal apparatus 1 or reading, forgery, and leakage of information of an allowed range may be checked.

The analysis apparatus 100 may perform analysis of various types of vulnerabilities and perform analysis of a server side request forgery (SSRF) vulnerability, an XML external entity (XXE) vulnerability, a command injection vulnerability, etc. Here, an SSRF attack allows an attacker to transmit a forged request to a server to allow a server to send a malicious request through an internal network, etc., and the SSRF vulnerability corresponds to a vulnerability on the web page or the web application which may permit the SSRF attack. The analysis apparatus 100 performs a simulated attack on the analysis target server 210 to extract the vulnerabilities of the analysis target server 210.

The cloud server 200 may be a server providing cloud computing. The cloud computing as a computing technique providing an IT resource as a service by utilizing an Internet technique corresponds to a technique that borrows and uses IT resources including software, a storage, a server, network equipment, etc., as needed and pays cost as much as a use amount while being supported with real-time scalability according to a service load. That is, the cloud computing may execute a plurality of virtual machines (VMs) in a physical server by using a virtualization technique and respective virtual machines may implement a virtual desktop, the storage, and the server providing different operating systems and services, respectively.

As illustrated in FIG. 1, the cloud server 200 according to an exemplary embodiment of the present invention may include a plurality of analysis target servers 210 therein and respective analysis target servers 210 may operate as web servers providing different web services. Furthermore, in some exemplary embodiments, the analysis apparatus 100 may be implemented as a virtual machine in the cloud server 200, a computer server, or a processor in a computer, etc.

The external server 300 may be a server arbitrarily set by the analysis apparatus 100 in order to analyze vulnerabilities. For example, the analysis apparatus 100 may guide the analysis target server 210 to access the external server 300 at the time of the SSRF simulated attack on the analysis target server 210. In this case, the external server 300 may generate an access record of the accessing analysis target server 210 and the analysis apparatus 100 may extract the SSRF vulnerability of the analysis target server 210 by a scheme of checking the access record of the external server 300. Further, even in the case of the simulated attack on the XXE vulnerability and the command insertion vulnerability, the analysis apparatus 100 may guide the analysis target server 210 to access the external server 300 and extract the vulnerabilities of the analysis target server 210 by a scheme of checking the access record of the analysis target server 210 shown in the external server 300.

The external server 300 may perform initial setting for analysis of each vulnerability performed by the analysis apparatus 100 in advance. In some exemplary embodiments, a plurality of analysis apparatuses 100 may analyze each vulnerability by using one external server 300 or one analysis apparatus 100 may analyze the vulnerabilities for the plurality of analysis target servers 210. In this case, the external server 300 needs to distinguish respective diagnosis apparatuses 100 requesting the analysis of the vulnerabilities and vulnerability analyses performed by the respective analysis apparatuses 100.

To this end, the external server 300 may first perform initial setting with the analysis apparatus 100 at the time of analyzing the vulnerability and in this case, the external server 300 may set identification information of the analysis apparatus 100 and analysis work information indicating each vulnerability analysis performed by the external server 300. Here, the identification information of the analysis apparatus 100 may be an IP address, a host name, or a media access control (MAC) address of the analysis apparatus 100 and the analysis work information may be a serial number, a letter, a symbol sequentially designated according to a performing order of each vulnerability analysis. That is, the external server 300 may distinguish each analysis apparatus 100 and the vulnerability analysis by encapsulating the identification information and the analysis work information of the corresponding analysis apparatus 100 at the time of generating the access record.

In some exemplary embodiments, the analysis apparatus 100 may access the external server 300 at the time of analyzing the vulnerability. For example, when the analysis apparatus 100 is implemented as the virtual machine in the cloud server 200, the IP address of the analysis apparatus 100 is similar to the analysis target server 210, and as a result, it may be misdetected that the analysis target server 210 accesses the external server 300. However, when the identification information such as the IP address of the analysis apparatus 100 is previously stored in the external server 300, the external server 300 may exclude the identification information from the access record at the time when the analysis apparatus 100 accesses the external server 300, and as a result, it is possible to perform an accurate vulnerability analysis.

Since the vulnerabilities of the respective analysis target servers 210 may be extracted from the access record provided by the external server 300, the security for the access record is very important. However, since the identification information of the analysis apparatus 100 which requests the analysis of the vulnerability is previously registered in the external server 300 through the initial setting, the external server 300 may accurately distinguish the analysis apparatus 100 which requests the vulnerability analysis by using the identification information. In other words, since the external server 300 may perform authentication by using the identification information at the time of requesting the access record, the external server 300 may accurately provide the access record while maintaining the security. In the related art, when the vulnerability such as SSRF is analyzed, the external server is monitored in real time to perform the analysis by the scheme of checking whether there is an access to the external server. However, it should be checked whether the access to the external server is performed by the analysis target server and when the access to the external server is performed by the analysis target server, it should be analyzed in which URL address among URL addresses of the analysis target server and in which parameter the vulnerability each exists, and as a result, there is a problem in that an analysis speed is slow.

On the other hand, in the vulnerability analysis system 1000 according to an exemplary embodiment of the present invention, the analysis apparatus 100 may set the identification key corresponding to each URL address included in the analysis target server 210 and when the access record is left in the external server 300, each identification key is together recorded, and as a result, it is possible to rapidly and accurately analyze the vulnerability for the analysis target server 210.

Figure 2:
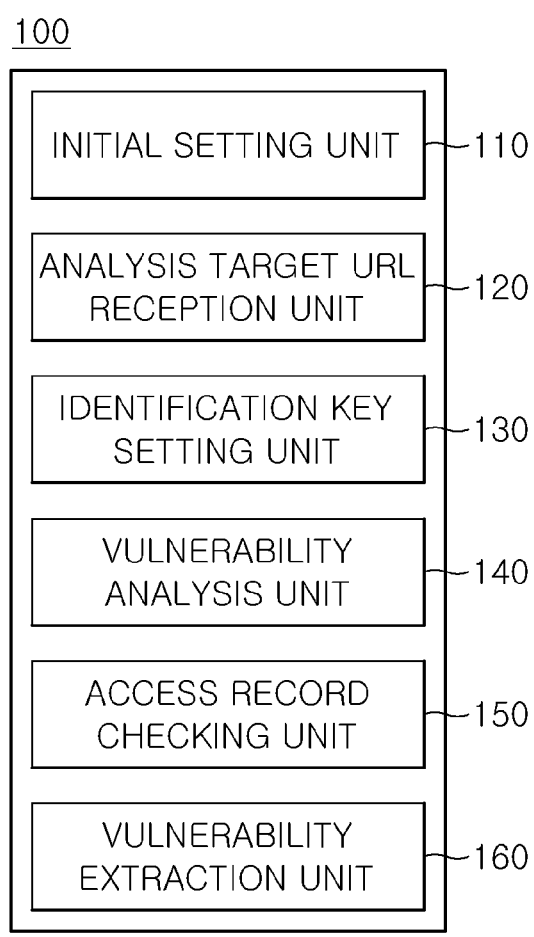
FIGS. 2 and 3 are block diagrams illustrating an analysis apparatus according to an exemplary embodiment of the present invention.

Referring to FIG. 2, the analysis apparatus 100 according to an exemplary embodiment of the present invention may include an initial setting unit 110, an analysis target URL reception unit 120, an identification key setting unit 130, a vulnerability analysis unit 140, an access record checking unit 150, and a vulnerability extraction unit 160. Each of the units 110, 120, 130, 140 and 150 may be individual processors designed to perform its specific task, or they may be software components performed on one or more processors.

The initial setting unit 110 may transmit, to the external server 300, identification information of the analysis apparatus 100 and analysis work information corresponding to vulnerability analysis work performed for the analysis target server 210. In other words, the initial setting unit 110 may register the vulnerability analysis work in the external server 300 in advance before performing the vulnerability analysis for the analysis target server 210. Accordingly, the external server 300 may distinguish the vulnerability analysis works performed by the respective analysis apparatuses 100 by using the identification information and the analysis work information registered by the initial setting unit 110.

Here, the identification information of the analysis apparatus 100 may be an IP address, a host name, or an MAC address of the analysis apparatus 100 and the analysis work information may be a serial number, a letter, a symbol sequentially designated according to a performing order of each vulnerability analysis performed by the analysis apparatus 100 or the external server 300.

The external server 300 may prevent misdetection for the access of the analysis target server 210 and perform authentication for an access record request by using the identification information and the analysis work information of the analysis apparatus 100 registered by the initial setting unit 110. However, since the misdetection prevention and the authentication for the access record request in the external server 300 are described above, a detailed description will be here omitted.

The analysis target URL reception unit 120 may receive a plurality of analysis target uniform resource locator (URL) addresses extracted from the analysis target server 210. The analysis target server 210 may include a plurality of web pages in order to provide the web service, and a plurality of URL addresses corresponding to the respective web pages may be set. The terminal apparatus 1 may access the analysis target server 210 by using the URL address of the analysis target server 210 and receive the web page corresponding to the URL address from the analysis target server 210 and output the received web page to a display unit (not illustrated) of the terminal apparatus 1.

However, at the time of performing the attack of SSRF on the analysis target server 210, since the URL address of the analysis target server 210 is modulated and input, the URL addresses included in the analysis target server 210 need to be collected. In other words, in order to check an external attack possibility using the URL address of the analysis target server 210 and determine the vulnerability, all URL addresses included in the analysis target server 210 may be set to the analysis target URL address.

Here, the analysis target URL reception unit 120 may directly extract the analysis target URL address from the analysis target server 210, but in some exemplary embodiments, when a web crawler collects the URL address of the analysis target server 210, the analysis target URL reception unit 120 may receive the URL addresses from the web crawler and set the received URL addresses to the analysis target URL address.

The identification key setting unit 130 may set respective identification keys corresponding to a plurality of analysis target URL addresses. Here, since individual attacks for the respective analysis target URL addresses are available, it is necessary to check the vulnerabilities for all analysis target URL addresses. In this case, in order to check in which URL address among the respective analysis target URL addresses the vulnerability exists, it is necessary to set the identification key in each analysis target URL address.

Figure 4:
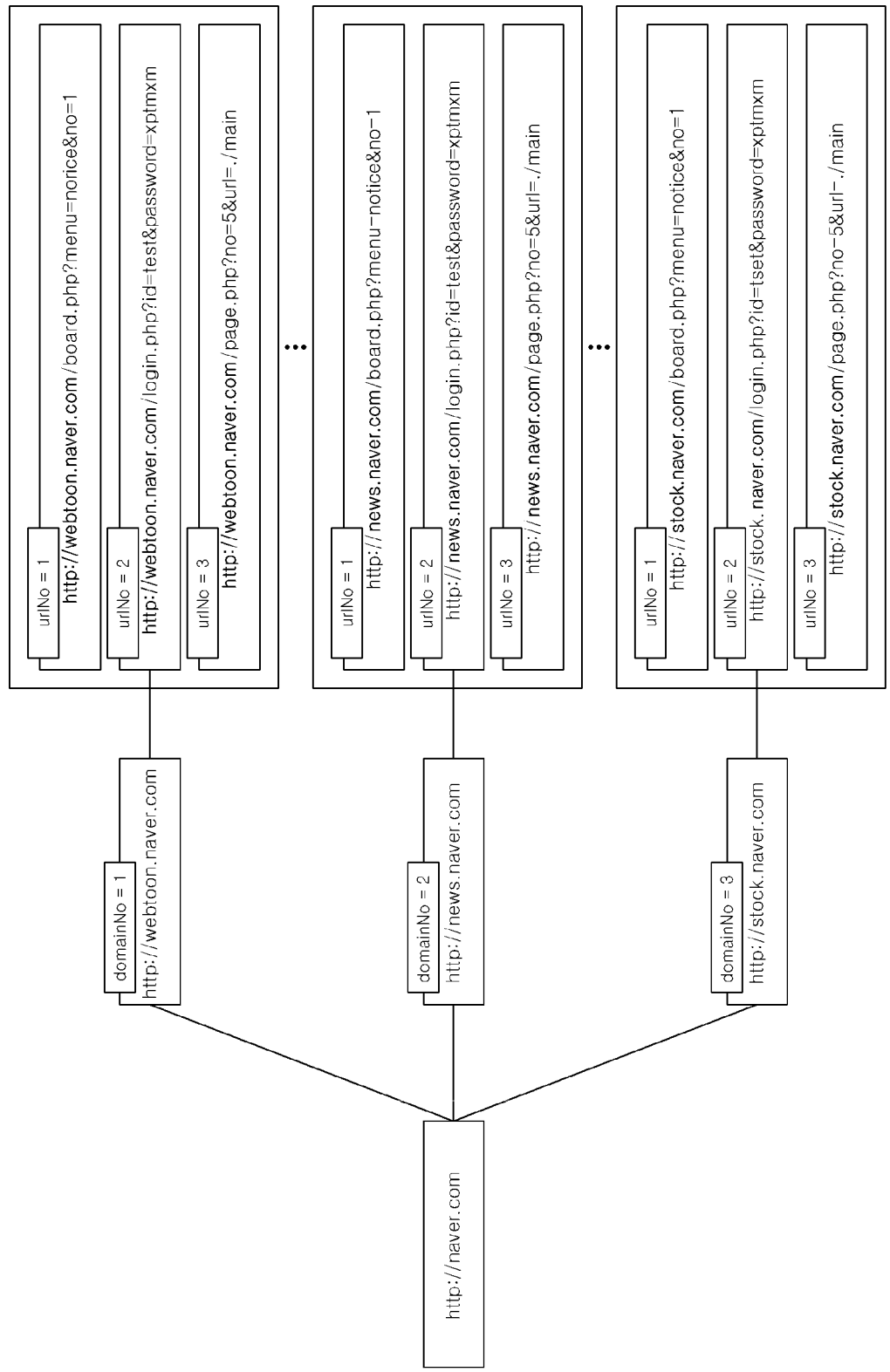
FIG. 4 is an illustration of setting of an identification key for a URL address to be analyzed according to an exemplary embodiment of the present invention.

Specifically, as illustrated in FIG. 4, when a plurality of domains is included in the analysis target URL address, the identification key setting unit 130 may set each domain identifier (domainNo) corresponding to the domain and distinguish each analysis target URL address for each domain. For example, the analysis target server 210 having an analysis target URL address of http://naver.com may include three domains, i.e., "webtoon", "news", and "stock".

In this case, the identification key setting unit 130 may sequentially set the domain identifier (domainNo) to 1, 2, and 3 with respect to the domains of "webtoon", "news", and "stock", respectively. Here, an exemplary embodiment in which the serial number is sequentially set is presented, but in some exemplary embodiments, various figures, letters, symbols, etc., may be used in order to distinguish the respective domains.

After the domain identifier is set, the analysis target URL addresses included in the domains of "webtoon", "news", and "stock", respectively may be collected and URL identifiers (urlNo) may be set with respect to the respective collected analysis target URL addresses. Here, serial numbers which sequentially increase from 1 may be set to the URL identifiers with respect to the respective analysis target URL addresses collected for each domain. However, since the respective domains may be distinguished with the domain identifiers, the URL identifiers of the respective domains may be set to start from 1.

Thereafter, the identification key setting unit 130 may combine the domain identifier (domainNo) and the URL identifier (urlNo) and set the combined identifiers as the identification keys of the respective analysis target URL addresses. For example, in the case of domainNo=2 and urlNo=3, the domain identifiers may be distinguished by identifying the analysis target URL address corresponding to "http://news.naver.com/page.php?no=5&url=./main". In some exemplary embodiments, the analysis apparatus 100 may include a database storing the identification key corresponding to each analysis target URL address.

The vulnerability analysis unit 140 may generate an analysis Hypertext transfer Protocol (HTTP) request sentence and perform the simulated attack so that the analysis target server 210 accesses the external server 300 by inserting the analysis HTTP request sentence into the analysis target URL address. Specifically, the vulnerability analysis unit 140 may replace the analysis HTTP request sentence with any one parameter value among the parameters included in the analysis target URL address and input any one parameter value. Here, the analysis HTTP request sentence may include the URL address of the external server 300 and the identification key of the analysis target URL address into which the analysis HTTP request sentence is inserted. In this case, the analysis HTTP request sentence may include a syntax for requesting to the external server 300 that the identification key and a parameter name are recorded in the external server 300. Further, the vulnerability analysis unit 140 may allow the analysis HTTP request sentence further including the analysis work information to be recorded in the external server 300.

The vulnerability analysis unit 140 may generate the analysis HTTP request sentence for each of the parameters included in the analysis target URL address, and the analysis HTTP request sentence may include the parameter name corresponding to the parameter into which the analysis HTTP request sentence is inserted. In other words, it may be represented which parameter the corresponding analysis HTTP request sentence is input by replacing, and when there is a plurality of parameters included in the analysis target URL address, the analysis HTTP request sentence corresponding to each parameter is generated to be replaced and input into the corresponding parameter.

Figure 5:
FIGS. 5A-5C are illustrations of analysis HTTP request sentences according to an exemplary embodiment of the present invention.

Specifically, as illustrated in FIG. 5A, the analysis target URL address may be present. Here, parameters included in "http://webtoon.naver.com/page.php?no=5&url=./main" which is the analysis target URL address correspond to "no" and "url". In this case, when the vulnerability for "no" is analyzed, the analysis HTTP request sentence may be inserted into the parameter value of "no" as illustrated in FIG. 5C.

In this case, the analysis HTTP request sentence may be generated as illustrated in FIG. 5B. The analysis HTTP request sentence may include "http://example_domain.com" which is the URL address of the external server 300 and further include analysis work information a, identification keys b and c, and a parameter name d. In other words, since "seq=9997", the analysis work information a is "9997', since "domainNo=1", the domain identifier b is "1", and since "urlNo=3", the URL identifier c is "3". Further, since "paramName=no", the parameter name d corresponds to "no".

Referring to FIGS. 4 and 5A, since the domain of http://webtoon.naver.com/page.php?no=5&url=./main which is the analysis target URL address is "webtoon" and the domain identifier b corresponding to "webtoon" is "1", "domainNo" of the analysis HTTP request sentence is set to 1. Further, since "http://webtoon.naver.com/page.php?no=5&url=./main" is a URL address which is collected third in the domain of "webtoon", the URL identifier c corresponds to "3" and "urlNo" of the analysis HTTP request sentence is set to 3. The parameters included in the analysis target URL address are "no" and "url', but here, the vulnerability for "no" is analyzed, and as a result, the parameter name d of the analysis HTTP request sentence corresponds to "no" and "paramName" is set to "no".

In general, even though the analysis HTTP request sentence includes only the URL address of the external server 300, the analysis target server 210 may be guided to access the external server. However, the vulnerability analysis unit 140 according to an exemplary embodiment of the present invention may make the analysis work information a, the identification keys b and c, and the parameter name be included in the analysis HTTP request sentence. In this case, information on the analysis work information, the analysis target URL address, the parameter name, etc., into which the analysis HTTP request sentence is inserted may be additionally recorded in the access record of the external server 300. In other words, since the analysis target URL address, parameter name, etc., which allow the analysis target server 210 to access the external server 300 are clearly recorded in the access record of the external server 300, it is possible to identify an extract location of the vulnerability.

When the analysis work information is further included and recorded in the external server 300, it is also possible to extract the access record corresponding to the corresponding analysis work information collectively after analyzing the vulnerability. In other words, the vulnerabilities may be extracted collectively after the vulnerability analysis is completed instead of monitoring the external server 300 in real time while analyzing the vulnerability.

The access record checking unit 150 may request the access record of the analysis target server 210 from the external server 300. In the case of the SSRF vulnerability, the XXE vulnerability, the command insertion vulnerability, etc., the analysis target server 210 checks whether there is an access to the external server 300 against each attack to determine whether there is a vulnerability of the corresponding analysis target server 210. Accordingly, the access record checking unit 150 may request the access record of the analysis target server 210 which accesses the external server 300.

However, since the vulnerability of the analysis target server 210 may be released from the access record, the external server 300 may request user authentication in response to the access record request. In this case, the access record checking unit 150 may transmit, to the external server 300, the analysis work information corresponding to the vulnerability analysis work performed by the analysis apparatus 100 and the identification information of the analysis apparatus 100. In other words, the access record checking unit 150 may perform the user authentication by providing the identification information and the analysis work information of the analysis apparatus 100 to the external server 300 and when the access record checking unit 150 succeeds in the user authentication, the access record checking unit 150 may receive the access record corresponding to the analysis work information from the external server 300. In some exemplary embodiments, the external server 300 may provide the access record as illustrated in FIG. 7 and the access record checking unit 150 uses the analysis work information (seq) to provide only the access record corresponding to the vulnerability analysis performed by the corresponding analysis apparatus 100. In other words, in the case of FIG. 7, only an access record in which the analysis work information (seq) is "3" may be limited to be provided.

Figure 6:
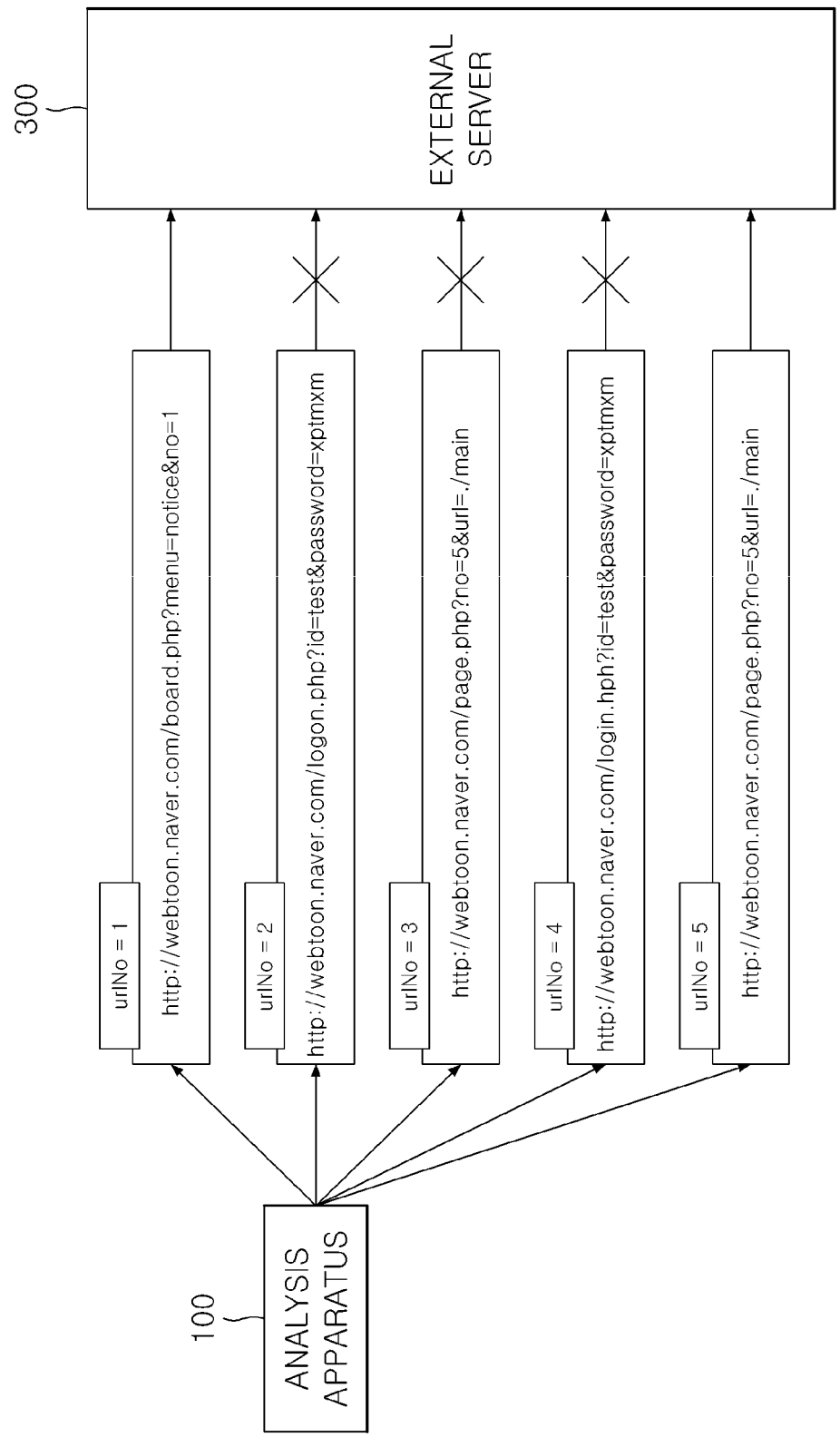
FIG. 6 is an illustration of an analysis of a vulnerability of an analysis apparatus according to an exemplary embodiment of the present invention.

The vulnerability extraction unit 160 may extract the vulnerability of the analysis target server 210 by using the identification key included in the access record. As illustrated in FIG. 6, the analysis apparatus 100 may perform the simulated attack on the analysis target URL address and there may be a case where the analysis target server 210 accesses the external server 300 against the simulated attack. That is, in the case of the analysis target URL address with the vulnerability such as SSRF, etc., the analysis target server 210 may be guided to access the external server 300. In FIG. 6, since the URL identifier (urlNo) is 2, 3, or 4, the analysis target server 210 does not access the external server 300, and as a result, there is no vulnerability, but when the URL identifier (urlNo) is 1 or 5, the analysis target server 210 accesses the external server 300, and it may be regarded that there is the vulnerability.

In this case, as illustrated in FIG. 7, the access record may be provided from the external server 300. Here, since the analysis work information (seq) of the vulnerability analysis performed by the analysis apparatus 100 corresponds to "3" and the vulnerability analysis performed in FIG. 6 is performed for the "webtoon" domain, the domain identifier (domainNo) may be constant as 1.

Referring to FIG. 7, since there are access records such as the domain identifier (domainNo) of 1, the URL identifier (urlno) of 1, and the parameter name of "no", the vulnerability extraction unit 160 may determine that the vulnerability is present in the "no" parameter in an analysis target URL address "http://webtoon.naver.com/board.php?menu=notice&no=1" in which the domain identifier is 1 and the URL identifier is 1. Further, it may be determined that the vulnerability is present in each of the parameters "no" and "url" parameters in an analysis target URL address "http://webtoon.naver.com/page.php?no=5&url=./main" in which the domain identifier is 1 and the URL identifier is 5. In other words, the vulnerability extraction unit 160 may extract the identification keys including the domain identifier, the URL identifier, and the like included in the access record and may set the analysis target URL address and the parameter corresponding to the identification key as the vulnerability.

Figure 3:
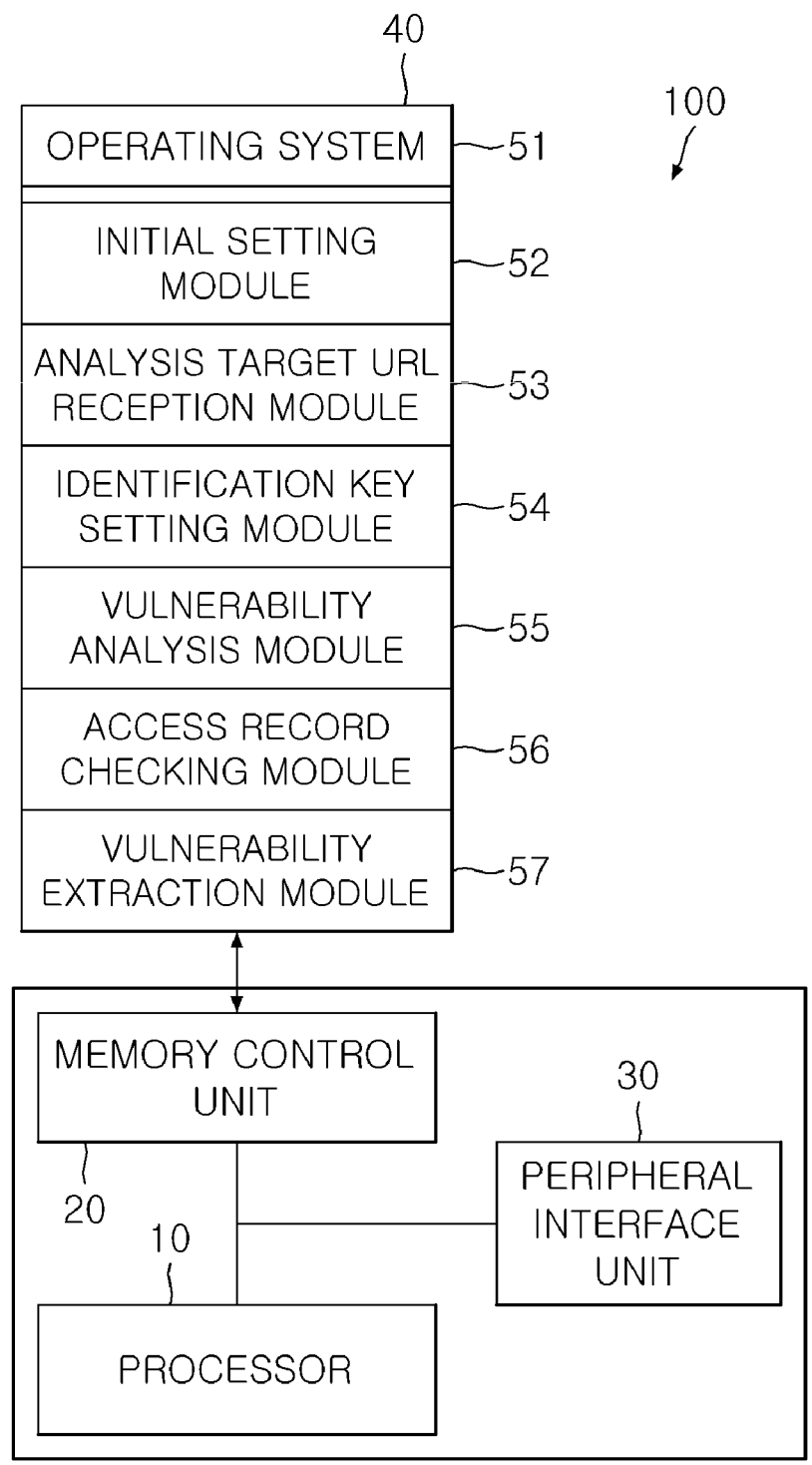

As illustrated in FIG. 3, the analysis apparatus 100 according to another exemplary embodiment of the present invention may include physical components including a processor 10, a memory 40, and the like and the memory 40 may include one or more modules configured to be executed by the processor 10. Specifically, one or more modules may include an initial setting module 52, an analysis target URL reception module 53, an identification key setting module 54, a vulnerability analysis module 55, an access record checking module 56, a vulnerability extraction module 57.

The processor 10 may perform various functions and perform a function of processing data by executing various software programs and a set of commands stored in the memory 40. The peripheral interface unit 30 may connect the input and output peripheral devices of the analysis apparatus 100 to the processor 10 and the memory 40 and a memory controller 20 may perform a function of controlling a memory access when the processor 10 or a component of the analysis apparatus 100 accesses the memory 40. In some exemplary embodiments, the processor 10, the memory controller 20, and the peripheral interface unit 30 may be implemented on a single chip or implemented as separate chips.

The memory 40 may include a high-speed random access memory, one or more magnetic disk storage devices, a non-volatile memory such as a flash memory device, and the like. Further, the memory 40 may further include a storage device located away from the processor 10 or a network attached storage device accessed through a communication network such as the Internet.

As illustrated in FIG. 3, in the analysis apparatus 100 according to an exemplary embodiment of the present invention, the memory 40 may include the initial setting module 52, the analysis target URL reception module 53, the identification key setting module 54, the vulnerability analysis module 55, the access record checking module 56, the vulnerability extraction module, and the like which correspond to application programs in addition to an operating system. Here, each of the modules as a set of commands for performing the aforementioned functions may be stored in the memory 40.

Accordingly, in the analysis apparatus 100 according to an exemplary embodiment of the present invention, the processor 10 accesses the memory 40 to execute the commands corresponding to the respective modules. However, since the initial setting module 52, the analysis target URL reception module 53, the identification key setting module 54, the vulnerability analysis module 55, the access record checking module 56, and the vulnerability extraction module 57 correspond to the initial setting unit 110, the analysis target URL reception unit 120, the identification key setting unit 130, the vulnerability analysis unit 140, the access record checking unit 150, and the vulnerability extraction unit 160, respectively, the detailed description thereof will herein be omitted.

FIG. 8 is a flowchart showing a method for analyzing vulnerabilities according to an exemplary embodiment of the present invention.

Referring to FIG. 8, the method for analyzing vulnerabilities according to an exemplary embodiment of the present invention may include an initial setting step (S10), an analysis target URL receiving step (S20), an identification key setting step (S30), a vulnerability analyzing step (S40), an access record checking step (S50), and a vulnerability extracting step (S60). Here, the respective steps may be executed by the analysis apparatus 100.

In the initial setting step (S10), the identification information of the analysis apparatus 100 and the analysis work information corresponding to the vulnerability analysis work performed with respect to the analysis target server 210 may be transmitted to the external server 300. In other words, before performing the vulnerability analysis for the analysis target server 210, the vulnerability analysis work may be registered in the external server 300 in advance. Accordingly, the external server may distinguish the vulnerability analysis works performed by the respective analysis apparatuses 100 by using the identification information and the analysis work information registered by the analysis apparatus.

Here, the identification information of the analysis apparatus 100 may be an IP address, a host name, or an MAC address of the analysis apparatus and the analysis work information may be a serial number, a letter, a symbol sequentially designated according to the number of execution times of the vulnerability analysis performed by the analysis apparatus or the external server 300.

In the analysis target URL receiving step (S20), a plurality of analysis target uniform resource locator (URL) addresses extracted from the analysis target server 210 may be received. Here, since an attacker may modulate and input the URL address of the analysis target server 210 at the time of attacking the analysis target server, the URL addresses of the analysis target server which may become an attack target need to be collected. In other words, in order to check an external attack possibility and determine the vulnerability, all URL addresses included in the analysis target server 210 may be set as the analysis target URL address.

Here, the analysis apparatus 100 may directly extract the analysis target URL address from the analysis target server 210, but in some exemplary embodiments, the URL addresses of the analysis target server may be received from a web crawler and set as the analysis target URL address. The web crawler may perform a function to collect the URL address of the analysis target server 210.

In the identification key setting step (S30), respective identification keys corresponding to a plurality of analysis target URL addresses may be set. In other words, in order to check in which URL address among the respective analysis target URL addresses the vulnerability exists, it is necessary to set the identification key in each analysis target URL address.

Specifically, when the analysis target URL address includes a plurality of domains, each domain identifier corresponding to the domain may be set and the respective analysis target URL addresses may be distinguished for each domain. Here, the domain identifier may be a serial number sequentially set, etc. Thereafter, each URL identifier may be set with respect to the analysis target URL address included in each domain. In other words, serial numbers which sequentially increase from 1 may be set to the URL identifiers with respect to the respective analysis target URL addresses collected for each domain. Here, the analysis apparatus combines the domain identifier and the URL identifier to set the identification key of each analysis target URL address and identify all analysis target URL addresses included in the analysis target server 210 by using the identification key.

In the vulnerability analyzing step (S40), an analysis Hypertext transfer Protocol (HTTP) request sentence may be generated and the simulated attack may be performed so that the analysis target server 210 accesses the external server 300 by inserting the analysis HTTP request sentence into the analysis target URL address. Specifically, the analysis apparatus 100 may replace the analysis HTTP request sentence with any one parameter value among the parameters included in the analysis target URL address and input any one parameter value. Here, the analysis HTTP request sentence may include the URL address of the external server 300 and the identification key of the analysis target URL address into which the analysis HTTP request sentence is inserted. In this case, the analysis HTTP request sentence may include a syntax for requesting the identification key and a parameter name to be recorded in the external server 300. Further, the analysis apparatus 100 may allow the analysis HTTP request sentence further including the analysis work information to be recorded in the external server 300.

The analysis apparatus 100 may generate the analysis HTTP request sentence for each of the parameters included in the analysis target URL address and the analysis HTTP request sentence may include the parameter name corresponding to the parameter into which the analysis HTTP request sentence is inserted. In other words, it may be represented which parameter the corresponding analysis HTTP request sentence is input by replacing, and when there is a plurality of parameters included in the analysis target URL address, the analysis HTTP request sentence corresponding to each parameter is generated to be replaced and input into the corresponding parameter.

Here, since the analysis HTTP request sentence further includes the analysis work information, the identification key, the parameter name, etc., information on the analysis work information, the analysis target URL address, the parameter name, etc., may be additionally recorded in the access record of the external server 300. In other words, since the analysis target URL address, parameter name, etc., which allows the analysis target server 210 to access the external server 300 are clearly recorded in the access record of the external server, it is possible to identify an extract location of the vulnerability.

When the analysis work information is further included and recorded in the external server 300, it is also possible to extract the access record corresponding to the corresponding analysis work information collectively or although after analyzing the vulnerability. In other words, it is possible to perform the vulnerability analysis by the scheme of extracting the access record collectively after the vulnerability analysis is completed instead of monitoring the external server 300 in real time at the time of analyzing the vulnerability.

In the access record checking step (S50), the access record of the analysis target server may be requested to the external server. In other words, in order to analyze the vulnerability for the analysis target server 210, the analysis apparatus 100 may request the access record of the analysis target server to the external server 300.

However, since it is possible to extract the vulnerability of the analysis target server 210 from the access record, the external server 300 may request the user authentication in response to the access record request. In other words, the analysis apparatus 100 may perform the user authentication by providing the identification information of the analysis apparatus 100 to the external server 300 and when the analysis apparatus succeeds in the user authentication, the analysis apparatus may receive the access record corresponding to the analysis work information from the external server.

In the vulnerability extracting step (S60), the vulnerability of the analysis target server 210 may be extracted by using the identification key included in the access record. The analysis apparatus 100 may attack the analysis target URL address and, in the case of the analysis target URL address with the vulnerability, the analysis target server 210 may be guided to access the external server 300.

In this case, the access record may include the identification key and the parameter name corresponding to the analysis target URL address and in the vulnerability extracting step (S60), the analysis target URL address and the parameter corresponding to the identification key may be set as the vulnerability.

The present invention described above can be embodied as computer readable codes on a medium in which a program is recorded. The computer readable media may continuously store computer executable programs or temporarily store the computer executable programs for execution or download. Further, the media may be various recording means or storage means of a form in which single hardware or several hardware is coupled, and is not limited to a medium directly connected to any computer system and may also be distributed on a network. Examples of the computer readable media may include magnetic media such as hard disks, floppy disks, and magnetic tape, optical recording media such as CD-ROM disks and DVD, magneto-optical media such as floptical disks, ROM, RAM, and flash memories and may be configured to store program commands. Further, examples of other media may also include recording media or storage media managed in app stores for distributing applications, or sites and servers for supplying and distributing other various software. Accordingly, the aforementioned detailed description should not be construed as restrictive in all terms and should be considered to be exemplary. The scope of the present invention should be determined by rational construing of the appended claims and all modifications within an equivalent scope of the present invention are included in the scope of the present invention.

The present invention is not limited by the aforementioned embodiments and the accompanying drawings. It will be apparent to those skilled in the art that components according to the present invention may be substituted, modified, and changed within the scope without departing from the technical scope of the present invention.

What is claimed is:

1. A method for analyzing security vulnerabilities of an analysis target server, using an analysis apparatus, the method comprising:
   an analysis target URL receiving step of receiving a plurality of analysis target uniform resource locator (URL) addresses extracted from the analysis target server;
   an identification key setting step of setting respective identification keys corresponding to the plurality of analysis target URL addresses;
   a vulnerability analyzing step of performing a simulated attack to access an external server by the analysis target server by inserting an analysis hypertext transfer protocol (HTTP) request sentence including a URL address of the external server and the identification key into the analysis target URL address;
   an access record checking step of requesting an access record of the analysis target server from the external server; and
   a vulnerability extracting step of extracting a vulnerability of the analysis target server by using the identification key included in the access record,
   wherein in the identification key setting step, when the analysis target URL address includes a plurality of domains, each domain identifier is set which corresponds to the domain, a URL identifier of each analysis target URL address included in the domain is set, and the domain identifier and the URL identifier are combined to be set as the identification key of the analysis target URL address, and
   wherein in the vulnerability extracting step, the identification key included in the access record is extracted and an analysis target URL address and a parameter corresponding to the identification key are set as the vulnerabilities.

2. The method of claim 1, further comprising:
   an initial setting step of transmitting to the external server identification information of the analysis apparatus and analysis work information corresponding to a vulnerability analysis work for the analysis target server.

3. The method of claim 2, wherein in the access record checking step, user authentication is performed by using the identification information and the analysis work information of the analysis apparatus, and an access record corresponding to the analysis work information is received.

4. The method of claim 1, wherein in the analysis target URL receiving step, the analysis target URL address is received from a web crawler collecting the analysis target URL address by accessing the analysis target server.

5. The method of claim 1, wherein in the vulnerability analyzing step, the analysis HTTP request sentence is replaced with any one parameter value among the parameters included in the analysis target URL address and any one parameter value is input.

6. The method of claim 5, wherein in the vulnerability analyzing step, the analysis HTTP request sentence is generated for each of the parameters included in the analysis target URL address and the analysis HTTP request sentence includes the parameter name corresponding to the parameter into which the analysis HTTP request sentence is inserted.

7. The method of claim 6, wherein the analysis HTTP request sentence includes a syntax for requesting the external server to record the identification key and the parameter name in the external server.

8. The method of claim 7, wherein the analysis HTTP request sentence further includes analysis work information corresponding to the vulnerability analysis work for the analysis target server and further includes the analysis work information and is recorded in the external server.

9. The method of claim 5, wherein in the vulnerability analyzing step, when there is a plurality of parameters included in the analysis target URL address, each of the analysis HTTP request sentences corresponding to respective parameters is replaced and input.

10. A non-transitory computer readable recording medium storing a computer program which, when executed by a computer, performs the method for analyzing security vulnerabilities of the analysis target server, as defined in claim 1.

11. An analysis apparatus for analyzing security vulnerabilities of an analysis target server, comprising:
   an analysis target URL reception circuits receiving a plurality of analysis target uniform resource locator (URL) addresses extracted from the analysis target server;
   an identification key setting circuit setting respective identification keys corresponding to the plurality of analysis target URL addresses;
   a vulnerability analysis circuit performing a simulated attack to access an external server by the analysis target server by inserting an analysis hypertext transfer protocol (HTTP) request sentence including a URL address of the external server and the identification key into the analysis target URL address;
   an access record checking circuit requesting an access record of the analysis target server from the external server; and
   a vulnerability extraction circuit extracting a vulnerability of the analysis target server by using the identification key included in the access record,
   wherein in the setting of the identification keys, when the analysis target URL address includes a plurality of domains, each domain identifier is set which corresponds to the domain, a URL identifier of each analysis target URL address included in the domain is set, and the domain identifier and the URL identifier are combined to be set as the identification key of the analysis target URL address, and
   wherein in the extracting of the vulnerability, the identification key included in the access record is extracted and an analysis target URL address and a parameter corresponding to the identification key are set as the vulnerabilities.

12. An analysis apparatus for analyzing security vulnerabilities of an analysis target server, comprising:
   a hardware processor; and
   a memory coupled to the processor,
   wherein the memory includes one or more modules which, when executed by the processor, perform the steps including,
   receiving a plurality of analysis target uniform resource locator (URL) addresses extracted from the analysis target server,
   setting respective identification keys corresponding to the plurality of analysis target URL addresses,
   performing a simulated attack to access an external server by the analysis target server by inserting an analysis hypertext transfer protocol (HTTP) request sentence including a URL address of the external server and the identification key into the analysis target URL address,
   requesting an access record of the analysis target server from the external server, and
   extracting a vulnerability of the analysis target server by using the identification key included in the access record,
   wherein in the setting of the identification keys, when the analysis target URL address includes a plurality of domains, each domain identifier is set which corresponds to the domain, a URL identifier of each analysis target URL address included in the domain is set, and the domain identifier and the URL identifier are combined to be set as the identification key of the analysis target URL address, and
   wherein in the extracting of the vulnerability, the identification key included in the access record is extracted and an analysis target URL address and a parameter corresponding to the identification key are set as the vulnerabilities.

* * * * *